United States Patent [19]

McFarland

[11] 4,290,076

[45] Sep. 15, 1981

[54] COMPENSATORY MEANS IMPROVING THE OPERATION OF ELECTROSTATIC PRINTERS

[75] Inventor: Keith E. McFarland, Woodside, Calif.

[73] Assignee: Xerox Corporation, Stamford, Conn.

[21] Appl. No.: 22,029

[22] Filed: Mar. 19, 1979

[51] Int. Cl.² ............................................ G01D 15/16
[52] U.S. Cl. ................................ 346/154; 346/153.1
[58] Field of Search ................................. 346/153, 154

[56] References Cited

U.S. PATENT DOCUMENTS

| | | | |
|---|---|---|---|
| 2,932,548 | 4/1960 | Nau | 346/153 |
| 2,932,690 | 4/1960 | Adams | 346/153 |
| 3,411,482 | 11/1968 | Brodie | 346/153 |
| 3,484,792 | 12/1969 | Gold | 346/153 |
| 3,631,509 | 12/1970 | Marshall | 346/154 |
| 3,717,880 | 2/1973 | Howell | 346/153 |
| 4,030,106 | 6/1977 | Bestenbreiner | 346/153 |

FOREIGN PATENT DOCUMENTS 1444728  8/1976  United Kingdom ................ 346/153

*Primary Examiner*—Jay P. Lucas
*Attorney, Agent, or Firm*—W. Douglas Carothers, Jr.

[57] ABSTRACT

For more efficient operation, many serial or line electrostatic printers operate at voltages above ground whether in the print or nonprint mode. The effect of these voltages is to cause the creation of varying current flow in the conductive portion of the recording medium employed in these types of printers. This current flow establishes points of potential and electric fields in the area of the development station of the printer causing the toner medium to deposit onto the surface of the toner dispenser. Toner build up on this surface detrementally provides a source of toner deposit as background or large dark areas on the recording medium. A compensating circuit is provided to sense these potentials and apply a current signal to the recording medium that nullifies the effect of this current flow and eliminate the detrimental depositing or plating out of toner or the toner dispenser surface. The current signal is applied to the conductive portion of the recording medium immediately adjacent to the development station on the upstream side thereof.

Also a compensating circuit is disclosed for reducing the deleterious toner stain effects produced on the recording medium when movement of the medium is stopped.

10 Claims, 6 Drawing Figures

COMPENSATORY MEANS IMPROVING THE OPERATION OF ELECTROSTATIC PRINTERS

BACKGROUND OF THE INVENTION

This invention relates to a compensatory circuits for electrostatic printers.

Known in the art are electrostatic printers of the type having a recording station and a development station through which a recording medium is passed. An example of such a printer is disclosed in U.S. Pat. No. 3,729,123. The recording medium comprises a dielectric portion supported by a substantially conductive backing portion. The dielectric portion supports a latent electrostatic image formed at the recording station which is then developed by a toner medium at the development station.

The latent image is formed by a plurality of recording styli or stylus type electrodes physically positioned to electrically address the dielectric portion of the recording medium as the medium travels through the recording station. Diametrically opposite to the stylus electrodes in a series of backup electrodes. These oppositely opposed stylus and backup electrodes form a printing gap. An electrostatic charge is deposited on the dielectric portion of the moving recording medium when the potential difference between an addressed stylus electrodes and the oppositely opposed backup electrodes is raised to a threshold level, usually 500 volts or more in most types of such printers. The passage of the recording medium through the development station renders the deposited charge visible. A liquid medium having suspended toner particles is presented to the surface of the dielectric portion with the deposited electrostatic image and toner particles are attached to an adhere to the electrostatic charged portions of the recording medium.

As exemplified in U.S. Pat. No. 3,729,123, in printing (forming electrostatic latent images), the addressed stylus electrodes are connected to ground while oppositely opposed backup electrodes are raised to large writing potentials of 500 volts or more.

The raising of substantially instantaneous potentials from zero to 500 volts on these electrodes requires expensive circuit drivers for the backup electrodes.

In order to reduce the requirements of such circuits and also increase the available writing time, the circuit drivers for stylus and backup electrodes are maintained at a bias level above ground. Modulating from a nonprinting to printing mode is done from the bias level to either a higher voltage level or to ground. For example, the backup electrodes may be maintained at plus 200 voltages and modulated for writing to plus 600 volts. At the same time the addressed stylus electrodes may be modulated from plus 200 voltages to zero. Shorter time requirements are obtainable in modulating these comparatively lower potential levels and less powerful and sophisticated electronic drivers are needed for this task. All that is necessary is single voltage supply. The necessary voltage amplitude modulation can easily be derived from the same power supply. Furthermore, the number of components is minimized and voltage translation requirements are minimized. Direct interfacing to control logic circuitry can be easily accomplished.

Examples of types of other above ground maintenance for non-printing and printing mode functions are illustrated in the electrode drivers and circuits of U.S. Pat. Nos. 3,569,983 and 3,958,251.

Although these desirable advantages are obtained in employing such above ground printing techniques, a varying potential level always exists across the printing gap due to the presence of above ground potentials. Although these potentials may not be sufficient to deposit an electrostatic charge on the recording medium during the nonprinting mode, they are sufficient to present problems elsewhere in the printer system. This varying but established potential creates a current flow in the conductive backing portion of the recording medium. The current in turn provides potentials above ground at points in the development station where the recording medium contacts the back-support or rest positioned opposite to the toner dispenser. Even though the back-support may be connected to ground reference as shown in U.S. Pat. No. 3,729,123, potentials above ground exist in the conductive portion of the medium at the development station due to contact impedance established between the back-support and the record medium. These potentials create electric fields strong enough to cause toner particles to "plate out" of the toner carrier medium and deposit on the surface of the toner dispenser. Through the passage of time, toner particles build up to an undesirable degree on the dispenser surface interferring with proper toning of electrostatic image on the dielectric portion of the medium.

Another problem that occurs in these printing systems is the development of triboelectric charge on the recording medium. This triboelectric charge is caused by the frictional drag of the recording medium over the stylus electrode dielectric head support. This charge creates an undesirable developed background in nonimage areas of the developed image during passage through the development station.

OBJECT AND SUMMARY OF THE INVENTION

It is the general object of this invention to improve the printing quality of electrostatic printers of the type disclosed and increase toning efficiency.

It is a prime objective of the present invention to eliminate the effects of the potentials established in the conductive backing portion of the recording medium due to printing above ground thereby eliminating detrimental toner deposits and toner buildup on the surface of the toner dispenser at the development station.

According to the present invention, a circuit is adapted to sense the potential in the recording medium at the development station, compare this input signal with a reference signal and provide an output signal in the form of a current that will effectively nullify the current flow in the recording medium. The output signal is applied to the conductive portion of the recording medium just ahead of or immediately adjacent to the upstream side of the development station. In effect, the current flow detected in the record medium at the development station is employed as an input to a compensatory circuit to provide a signal to counteract the current flow in the recording medium between the recording and development stations.

The compensatory circuit of the present invention compensates not only for current flows established in the conductive portion of the medium and triboelectric effect (contact "writing") developed at the recording and development station but also compensates for neutralization currents created during toning of the electrostatic image. Also compensated are variable changes in the current flow in the conductive portion due to varying contact impedences of the recording medium relative to the electrodes, toner dispenser and back-support and also due to varying medium resistance and changes in potential at the backup electrodes during printer operation.

A compensatory circuit may also be included to reduce the deleterious toner stain effects produced on the recording medium when movement of the medium is temporarily.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
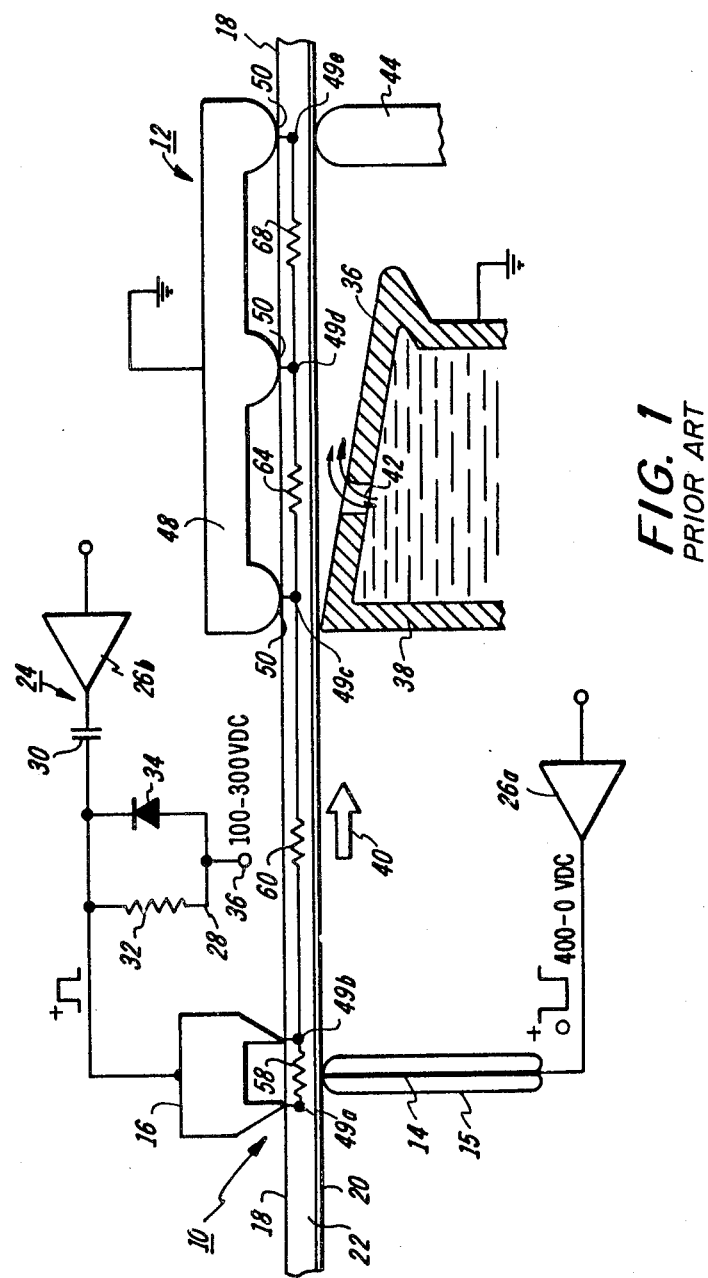
FIG. 1 is a diagrammatic illustration for explaining the operation of the recording and development stations of an electrostatic printer.

Referring to FIG. 1, illustration is made of the typical arrangement for the recording station 10 and the development station 12 of an electrostatic printer. At the recording station 10, there is providing a plurality of writing stylus electrodes, one shown at 14, embedded in a dielectric electrode head support 15 and a plurality of backup electrodes, one of which is shown at 16. These electrodes are positioned opposite opposed relation to form a printing gap through which the recording medium 18 travels.

The recording medium 18 comprises a dielectric portion 20 and a substantially conductive portion 22. Conductive portion may have a sheet resistance of 5 to 50 megaohms per square at 50% relative humidity. The electrostatic latent image is formed on the dielectric portion 20 and then is subsequently developed at development station 12. As the medium 18 moves through the recording gap, the electrodes 14 and 16 may be addressed by driving circuits to cause printing, i.e., the establishment of electrostatic charged portions on the surface of dielectric portion 20 in image wise configuration. The driving circuits 24 for backup electrodes 16 comprise a driver 26b to provide a primary but below threshold voltage signal. Hybrid drivers are used for driving both electrodes 14 and 16. Driver 26a supplies voltage pulses or voltage levels to stylus electrode 14 while driver 26b, with appropriate circuitry, supplies voltage pulses or voltage level to backup electrode 16. For example, drivers 26 may provide a 400 VDC pulse or voltage level when activated.

Driver 26b is capacitively coupled to a decoupling network 28. Coupling is by means of capacitor 30. The network 28 comprises parallel connected resistor 32 and protecting diode 34. Network 28 is connected to a maintained voltage supply source indicated at 36.

In operation, driving circuit 24 for backup electrodes 16 provides an added voltage level to the output of driver 26b. For example, driver 26b may operate to provide a voltage pulse or level of 400 VDC which coupled to network 28 may provide a full pulse amplitude of 700 VDC. The source 36 is provided with a voltage level of between 100 to 300 VDC so that the possible result voltage pulse to backup electrode 16 is a combination of the transition voltage 400 VDC from driver 26b and the selected base voltage level (between 100–300 VDC) from network 28, which may provide a resultant voltage from 500 VDC to a maximum of 700 VDC. The resultant backup electrode voltage, therefore, may range from a minimum level of 100 VDC in an OFF state to a maximum of 700 VDC in the ON state.

Driver 26a provides a voltage level of 400 VDC to stylus electrode 14 during the nonwriting mode. In the writing mode, the level is reduced to zero or near zero voltage.

All voltage pulses or levels are positive. At any time during operation, there is always a positive voltage level applied to the backup electrodes 16. If the backup electrode 16 is OFF (100 VDC) and the stylus electrode 14 is OFF (400 VDC), no printing (establishment of a charge on dielectric portion 20) will occur because the resultant voltage level is only 300 VDC. If driver 26b is placed in an ON state, the voltage level at backup electrode will be at a maximum of 500 to 700 VDC. The resultant voltage level between electrodes is 150 to 350 VDC, well below threshold values. If, however, driver 26a is placed in its ON state, that is, turned off to zero VDC, the resultant voltage difference between electrodes will be 500 to 700 VDC, permitting printing to occur.

In all cases whether printing is occurring or not, there is always a positive voltage level present on all of the backup electrodes 16. The backup electrodes 16 are at all times in contact with the conductive backing portion 18. These voltages, which may be varying depending on the state of electrode addressing, produce a current flow in the conductive portion 22 of medium 18. With this current flow, the potential level of the conductive portion is always above ground, albeit a small amount. One point of reference to ground for the medium conductive portion 22 is at the development station 12.

At station 12, there is a toner dispenser 38 from which a toner medium is applied to the dielectric surface as the recording medium 18 moves in the direction indicated by arrow 40. The toner medium flows out of the toner dispenser, as indicated by arrows 42, and engages the full width of the surface of the dielectric portion 20. Excess toner may be wiped off by means of blade 44, which also supports medium 18 as it is guided through development station 12. Guidance and tolerance maintenance relative to the surface 36 of dispenser 38 is accomplished with the aid of backsupport 48. Backsupport 48 has one or more points of contact illustrated at 50 with the recording medium 18. Both backsupport 48 and dispenser 38 are normally at ground reference.

The continual maintanence of voltage levels at backup electrodes 16 will provide current flow in conductive portion 22 to ground via backsupport 48 and establish points of potential at points 49 where contacts 50 engage the recording medium 18. These potentials are sufficient to establish electric fields above dispenser 38 which cause toner to "plate out" or deposit on surface 36 resulting, over a period of time, in a toner buildup on this surface. This toner buildup will then cause undesirable background to form on the image being developed as well as leave large and undesirable toner marks or streaks on the medium 18 during movement of the medium through station 12.

Also the triboelectric charge effect established on the dielectric portion 20 as it is pulled across head support 15 and across the dispenser 38 causes some toning of nonimage background areas which is undesirable, effecting the resolution of the resultant visible image.

Furthermore, neutralization currents are created by toner medium 42 due to toner particles neutralizing the charge pattern on dielectric portion 20.

Figure 2:
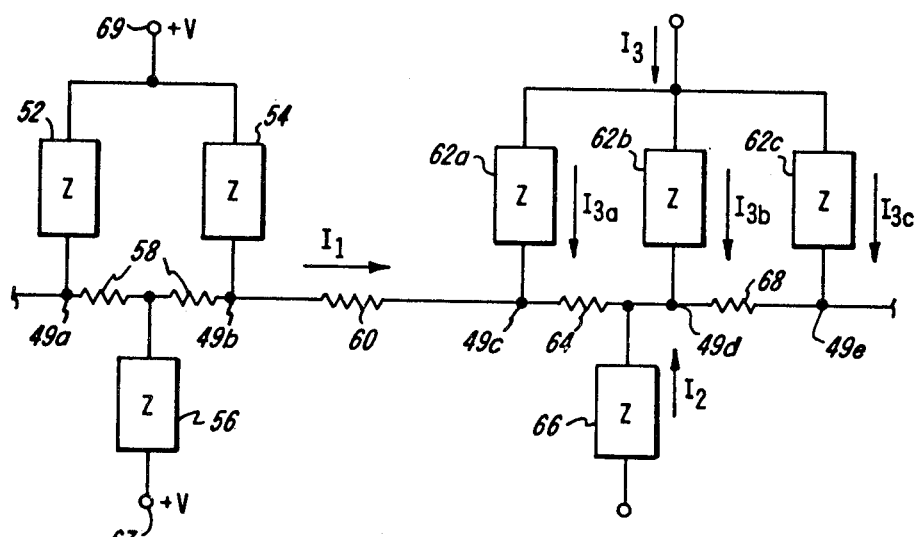
FIG. 2 is an equivalent circuit of the current flow and potential points established in the conductive backing portion of the recording medium used in the printer of FIG. 1.
Figure 5:
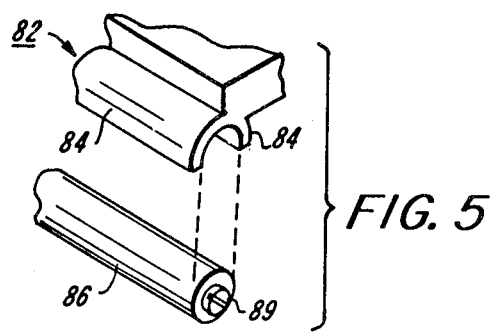
FIG. 5 is a partial detail perspective of a feature shown in FIG. 4.

FIG. 2 is an electrical equivalent circuit for FIG. 1 and is now discussed in order to more fully understand the effects of the established current flow in the conductive portion 22 of the medium 18.

Impedance circuits 52 and 54 represent the contact impedance between backup electrodes 16 and the conductive portion 22 of medium 18. Impedance 56 represents the contact impedance established between the stylus electrodes 14 and the conductive portion 22 of medium 18. This impedance includes that of the gap between electrodes 14 and the surface of the dielectric portion 20 as well as the impedance established across dielectric portion 20. The resistances 58, 60, 64 and 68 represent resistive values of the conductive portion 22 itself between conductive contact points 49 established at and between stations 10 and 12. Impedance circuits 62a, 62b and 62c represent the contact impedances established at contact points 50 betweeen backplate 48 and the conductive portion 22. $I_3$ represents the current flow from ground and conductive portion 22. Impedance 66 represents the impedance established by toner medium and includes the impedance established across the dielectric portion 20 at the development station 12. $I_2$ represents the current flow created by the toning of the dielectric portion 20, neutralizing the charge of the latent electrostatic image. Impedance 66 further includes impedance established by the triboelectric effect caused by frictional drag of medium 18 over the dielectric surface of dielectric head support 15.

These impedances are complex but for the most part represent capacitance and resistance elements established at the points just indicated.

With the maintenance of at least a varying but positive voltage level at 67 and 69, as established driving circuits 24, a circuit arrangement relative to ground exists which includes the recording medium 18 itself. Current flow, identified as current $I_1$, is established in the conductive portion 22 between stations 10 and 12. $I_2$ is created during toning relative to the grounded dispenser 38. $I_3$, ($I_{3a}$, $I_{3b}$, and $I_{3c}$ via contact points 50 with their sum equal to $I_3$) is established between grounded backplate 48 and the recording medium 18. Generally, $I_2$ plus $I_3$ can be said to be equal to $I_1$. By neutralizing varying current $I_1$, there will be no potentials established at contact points 50 (represented by impedances 62a, 62b, and 62c) and plating out of toner will not occur on surface 36. Also the triboelectric effect can be nulified. This is accomplished by the employment of circuit 70 in FIG. 3 which monitors conditions at development station 12 and provides an output signal, $I_c$, to nullify the effect of currents $I_1$, and $I_2$.

Figure 3:
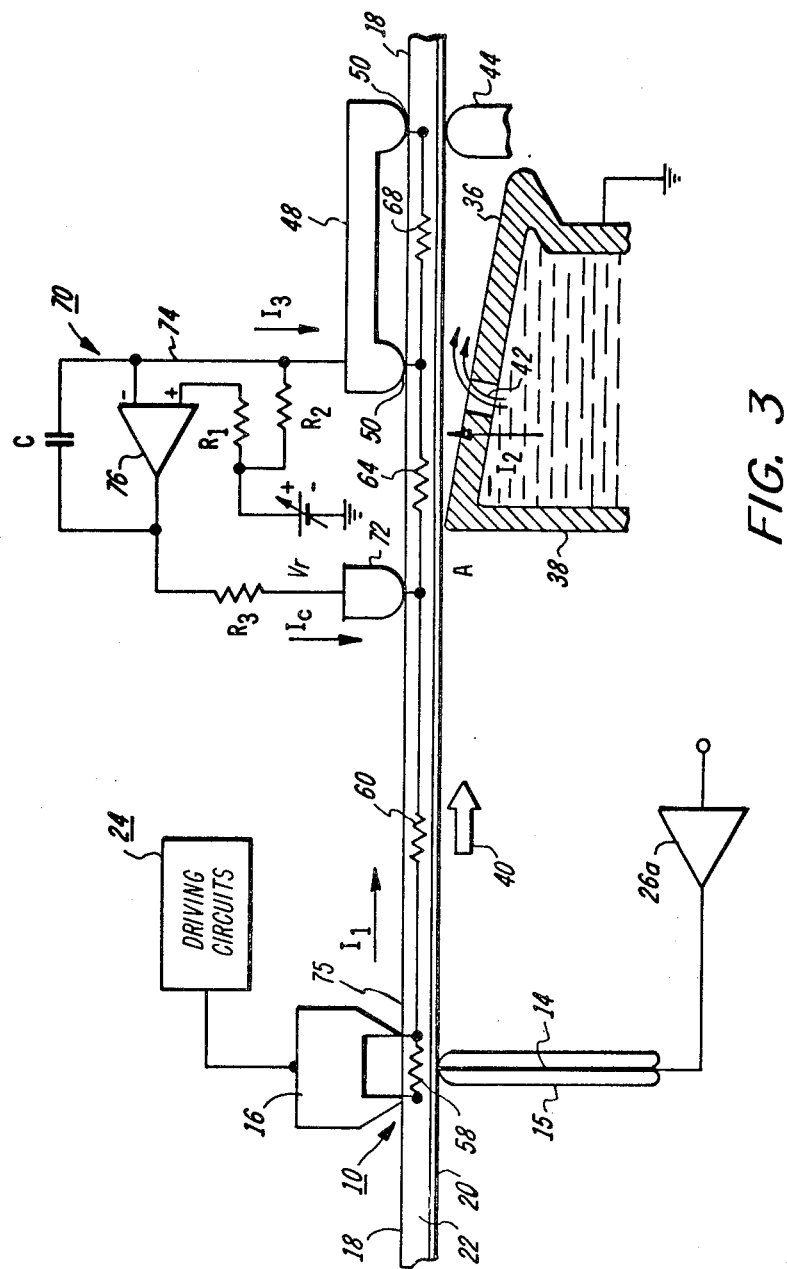
FIG. 3 is a diagrammatic illustration of FIG. 1 including the compensatory circuit means by which the objective of the present invention is satisfied.

In FIG. 3, like components have the same numerical identifiers.

Backplate 48 in FIG. 3 is not connected to ground but is supported in the printer in a manner to be isolated from ground. Circuit 70 senses the potential on the conductive portion 22 of the medium 18 and provides an output current, $I_c$, to be applied via contact electrode means 72 to conductive portion 22. Current, $I_c$, nullifies the current flow by satisfying the equation at point A:

$$I_1 + I_2 + I_c = 0.$$

Electrode means 72 need not be a separate component from backplate 48 as long as it is electrically isolated therefrom. The requirement is that it be a contact point capable of introducing signal, $I_c$, into the medium conductive portion 22 preferably upstream or in advance of the development station 12.

Circuit 70 has its input line 74 connected to backplate 48 which is, in turn, connected to the inverting input of operational amplifier 76. The noninverting input of amplifier 76 is connected to an adjustable voltage source, $V_r$, through resistor, $R_1$. Resistor $R_2$ is connected between source $V_r$ and resistor R1 and input line 74. Capacitor, C, is connected across the output of amplifier 76 and the inverting input and represents the feedback impedance to the inverting input and sets the bandwidth for operational amplifier 76. Limiting resistor $R_3$ is connected between electrode means 72 and the output of amplifier 76.

Functionally circuit 70 establishes potential at contact points 50 equal to the potential established by $V_r$, since $I_3$ will be reduced to zero. Amplifier 76 applies a signal $I_c$ which establishes equal potential conditions at the amplifier inputs, i.e., $V_r$ equals the potentials established at points 50 so that $I_3$ equals zero. Circuit 70 has a high impedance input so that $I_3$ is comparatively a very small value.

As a result, there is continuous compensaion for any current flow in conductive portion 22 regardless of (1) varying contact impedances 62 at contact points 50, (2) varying current, $I_1$, which is a function of the varying addressing voltages applied by driving circuits 24 and varying changes in impedance 60 and (3) the image neutralization currents, $I_2$, created by toning of the latent electrostatic image on the surface of dielectric portion 22. The maintanence of points 50 as a unipotential surface relative to dispenser 38 on a continuous basis will effectively eliminate deposits of toner build-up upon surface 36.

The frictional drag of the record medium 18 over the dielectric head support 15 creates a triboelectric charge effect at the development station 12. This effect causes the toner to be attracted to nonimage background areas where the triboelectric charge is present. Source, $V_r$, can be adjusted to a threshold value so that this triboelectric charge effect may be reduced or otherwise eliminated upon toning. As a result there is no toning of the nonimage background areas.

The operation of compensatory circuit 70 may be interrupted during periods of time the medium 18 is not moving and/or when dispenser 38 is not momentarily in operation.

Figure 4:
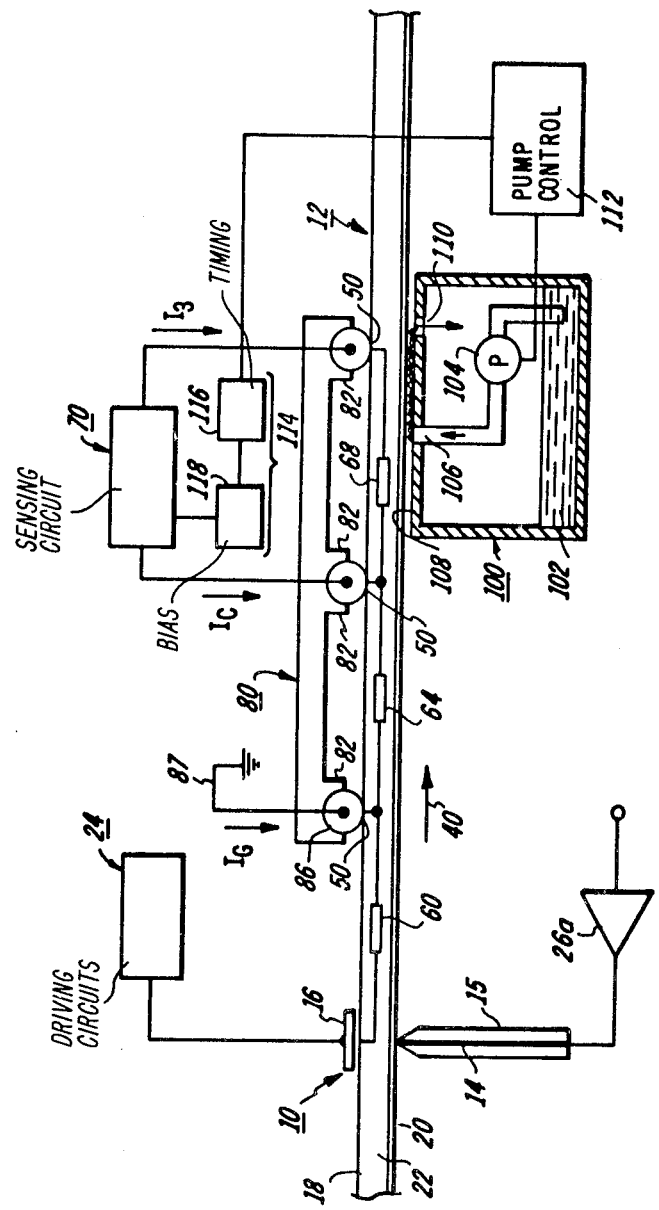
FIG. 4 is a diagrammatic illustration similar to FIG. 3 and includes additional features that may be employed in conjunction with the compensatory circuit means.

FIG. 4 illustrates some additional features in conjunction with the present invention. The backsupport 80 is fabricated or molded from dielectric material, such as, plastic. Three molded clamp members 82 are provided the full width of backplate 80. The walls 84 of the members 82 act as spring bias portions into which is inserted the contact members 86. The walls 84 are formed to be slightly smaller than the circumferential surface of members 86 so that the walls 84 firmly grip the contact member 86.

The contact members 86 may be composed of solid rods of metallic material.

The compensatory circuit 70 described in connection with FIG. 3 is shown connected to contact members 86 of backplate 80. Fasteners 89 at one end of the contact members are used to connect the electrical leads to the circuit 70. Input line 74 is connected to the contact member 86 over the liquid toner fountain 100 for sensing the potential at this point. Output of the circuit 70 is connected to the contact member 86 just ahead of the fountain 100.

The contact member 86 closest to the recording station 10 in this configuration is connected to ground via lead 87.

The arrangement and function of compensatory circuit 70 in FIG. 4 is the same as that in FIG. 3 except that the ground connection via lead 87 and its contact member 86 acts as a voltage divider relative to the other contact members. This will reduce the magnitude requirements for the correction signal, $I_c$ and the magnitude requirements for the operational amplifier 76.

The fountain 100 has toner supply 102 which pumped by pump 104 out of entrance slit 106 onto the fountain surface 108 where the liquid toner engages the medium 18. Toner is returned to the supply through exit slit 110. Pump 104 is operated by means of pump control 112. Also, connected to pump control is a bias control circuit 114 comprised of a timing circuit 116 connected to control 112 and connected to bias supply 118. Bias control 118 represents the variable voltage supply, $V_r$, and operates to provide a switchable reference source. Bias control 118 may be a D-A converter and can be programmed under time control to create an increased repelling bias on the recording medium when pump 104 is not operating and the flow of toner to surface 108 has ceased.

The purpose of control circuit 114 is to reduce the visible stain produced across the dielectric portion 20 of the medium 18 when the movement of the medium is intermittently stopped during recording. When medium movement is stopped the pump control 112 will automatically cease the operation of pump 104. As a result, toner on fountain surface 108 will drain back into supply 102 except for a toner meniscus established between the fountain surface 108 and the medium 18. This meniscus is maintained by the electrical field established between the charged medium, toner and toner fountain. The meniscus creates a toner stain across the stationary medium.

The bias control circuit 114 is placed into operation each time the medium movement is terminated and just prior to or simultaneously with the termination of the operation of pump 104. Preferably, the operation is just prior to the termination of the pump operation so that the toner meniscus does not have sufficient time to become established. A signal from pump control 112 causes timing circuit 116 to operate supply $V_r$ to a higher switched reference value to provide a bias via circuit 70 on contact member 86 to repel toner particles from the medium directly over fountain 100. The toner meniscus is, therefore, not established. The applied bias is not sufficiently high to cause any significant plating of toner onto the fountain surface 108.

Thus, the combination of circuits 70 and 114 provide for continuous maintenance of unipotential conditions at development station 12.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims. For example, the compensatory function could be applied at point 75 near the backup electrodes 16 at the recording station 10. A compensatory current, $I_c$, could be applied at 75 in FIG. 3 to make certain that a repulsive bias is supplied to render the potential zero on the conductive portion 22. This would be ideal for situations where large solid or distributed patterns are present in the image being produced, such as, bar graphs as compared to alphanumeric information, giving rise to large image or development currents, $I_2$, at the development station. In such situations it would be desirable to operate at near zero potential on the overage by introduction of the compensating current, $I_c$, at 75 at the backup electrodes. In practice, a small negative potential would be applied counteracting above ground potentials for those backup electrodes on the overage in their off mode relative to the particular image or plot being electrostatically created. The average compensating signal could also be more accurately determined by scanning, on a periodical basis, the backup electrode segments to sense their instantaneous state with such scanning interrupted when no modulation is occurring at the recording station.

Figure 6:
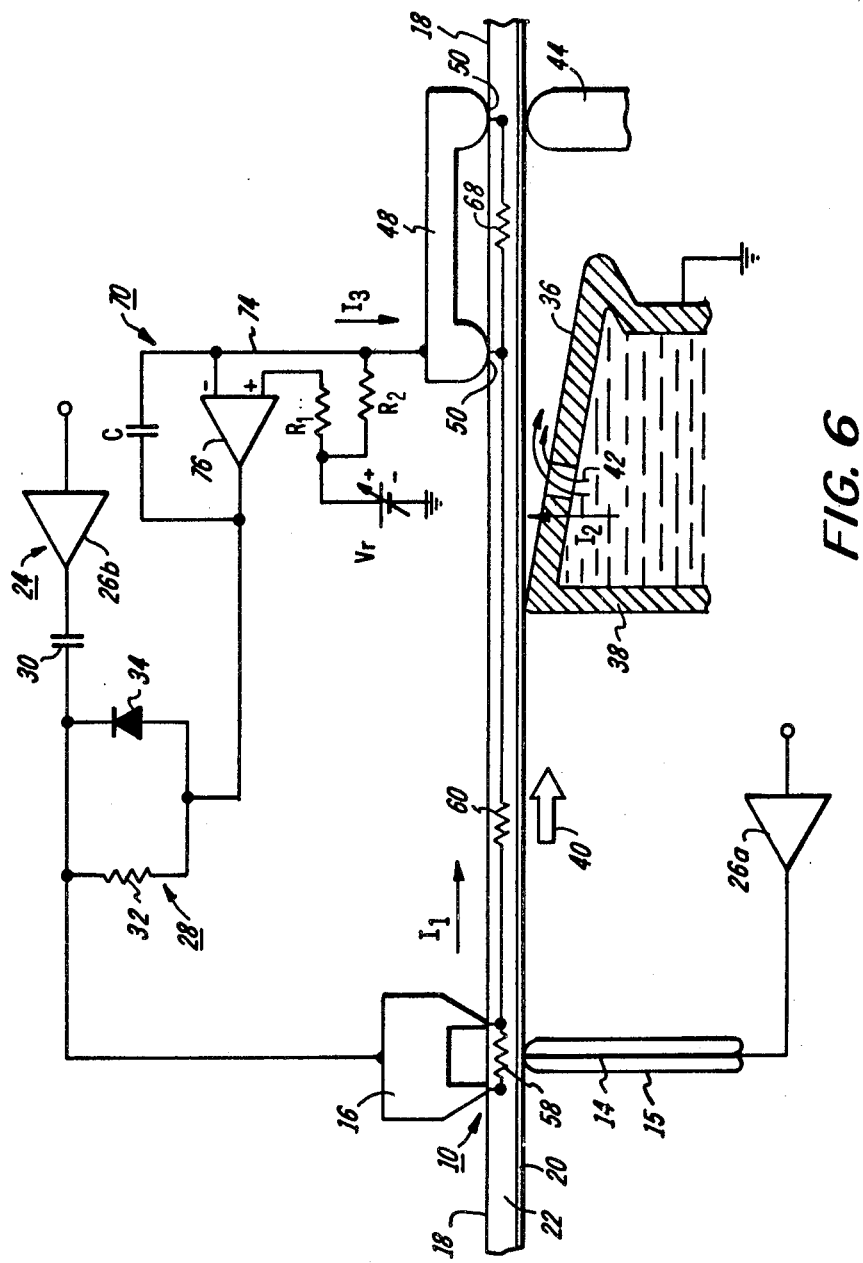
FIG. 6 is a diagrammatic illustration shown in FIG. 3 with a modification as to the point of compensation.

A further example is shown in FIG. 6, which is similar to FIG. 3, except that the output is connected to provide the minimum voltage level to couple with the output of driver 26b. In this arrangement, the potential on the conductive portion 18 is sensed at the development station and compensatory circuit 70 provides an output to adjust the minimum potential level for driving back electrodes 16 in a manner that the minimum floating potential on the medium at any given time is substantially zero and the current flow through the conductive portion is minimized. The condition desired is to operate at the recording station near ground and maintain the average operating bias near zero. This is done through the introduction of a variable bias at the backup electrodes. The average voltage, for example, would be the maximum total voltage applied to the backup electrodes divided by the average number of stylus electrodes operating in a given time and times the number of backup electrodes operating in a given time. The overage bias could also be more accurately determined by scanning, on a periodical basis, the backup electrode segments to sense their instantaneous state with scanning interrupted when no modulation is occurring at the recording station.

This system of compensation is particularly important where heavy image currents are present at the recording station, such sold image areas in a plotting mode.

What is claimed is:

1. In an electrostatic printer of the type having a recording station and a development station, said recording station including electrode means for forming a latent electrostatic image on a recording medium moving through said recording station and thence through said development station, a portion of said recording medium being conductive, a potential above ground maintained at said electrode means during nonprinting periods, said potential being below image forming potentials, all of said potentials establishing a current in said medium conductive portion during printing and nonprinting periods, circuit means provided at said development station to compensate for the effects of said current in said recording medium, the input of said circuit means connected to sense the current in said medium at said development station and the output of said circuit means connected to engage said medium at the upstream side of said development station to nullify said current.

2. The printer of claim 1 wherein said circuit means includes an operational amplifier.

3. The printer of claim 1 wherein said circuit means output is connected to engage said medium adjacent to the point of entrance into said development station.

4. The printer of claim 1 wherein said circuit means output is connected to said electrode means to establish a floating bias at said recording station to minimize said recording medium current.

5. The printer of claim 1 wherein said circuit means includes means to switch to and apply an electrical bias for a specific duration to deter the establishment of a toner medium meniscus between said recording medium and said development station when the movement of said recording medium and the application of said toner medium are terminated.

6. The printer of claim 5 wherein said electrical bias is applied just prior to the termination of said toner medium application.

7. In an electrostatic printer wherein a recording medium comprising a dielectric portion and a conductive backing portion is moved along a path through a station wherein a latent image is formed on the surface of said dielectric portion and thence through a development station wherein a toner medium is applied to said dielectric surface to develop the latent image, circuit means connected at said development station and adapted to sense the current said conductive portion and produce an output signal, means to engage said conductive portion at least immediately adjacent to and on the upstream side of said development station, the output signal from said circuit means connected to said engage means to neutralize the current in said recording medium.

8. The printer of claim 7 wherein said circuit means includes means to switch to apply an electrical bias for a specified duration to said medium conductive portion to deter the establishment of a meniscus by said toner medium between said recording medium and said development station when the movement of said recording medium and the application of said toner medium are terminated.

9. A circuit for nulifying the flow of current in a traveling recording medium employed in an electrostatic recorder, input means connected to said circuit and adapted to sense the current flow at the point where the current flow is desired to be nulled, output means connected to said circuit means and adapted to engage said recording medium at a position upstream from said point in a direction opposite to the movement of said recording medium, said circuit supplying an output signal to said output means to reduce said current flow to zero.

10. In an electrostatic printer wherein a recording medium is moved along a path through a recording station wherein a latent image is formed on the surface of said medium and thence through a development station wherein a liquid toner medium is applied to said medium to develop the latent image, circuit means connected to apply an electrical bias for a specified duration on said medium on the side of said medium opposite to the applied toner medium to deter the establishment of a liquid toner meniscus between said recording medium and said development station upon termination of the movement of said recording medium and the termination of the application of said toner medium to said recording medium.

* * * * *